Jan. 26, 1971 L. N. LIEBERMANN ET AL 3,559,049
METHOD AND APPARATUS FOR DETECTING GASEOUS IMPURITIES IN
ACCORDANCE WITH CHANGES IN SPARK BREAKDOWN
POTENTIAL CAUSED THEREBY
Filed July 2, 1968 5 Sheets-Sheet 5
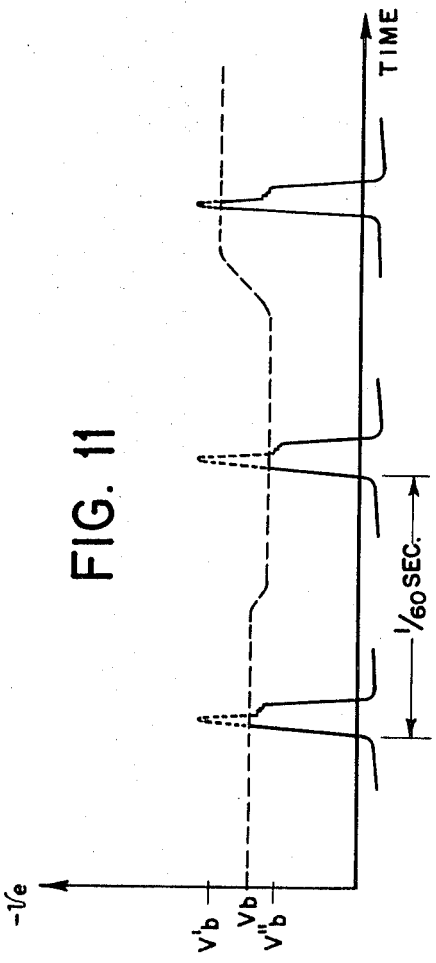
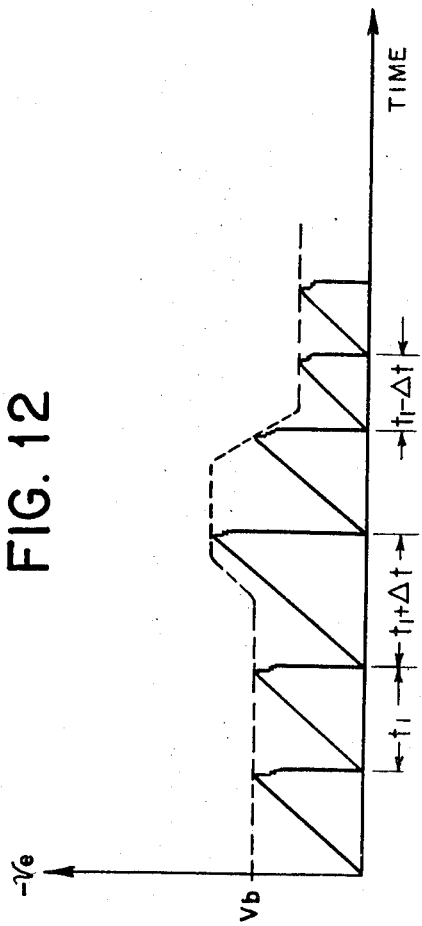
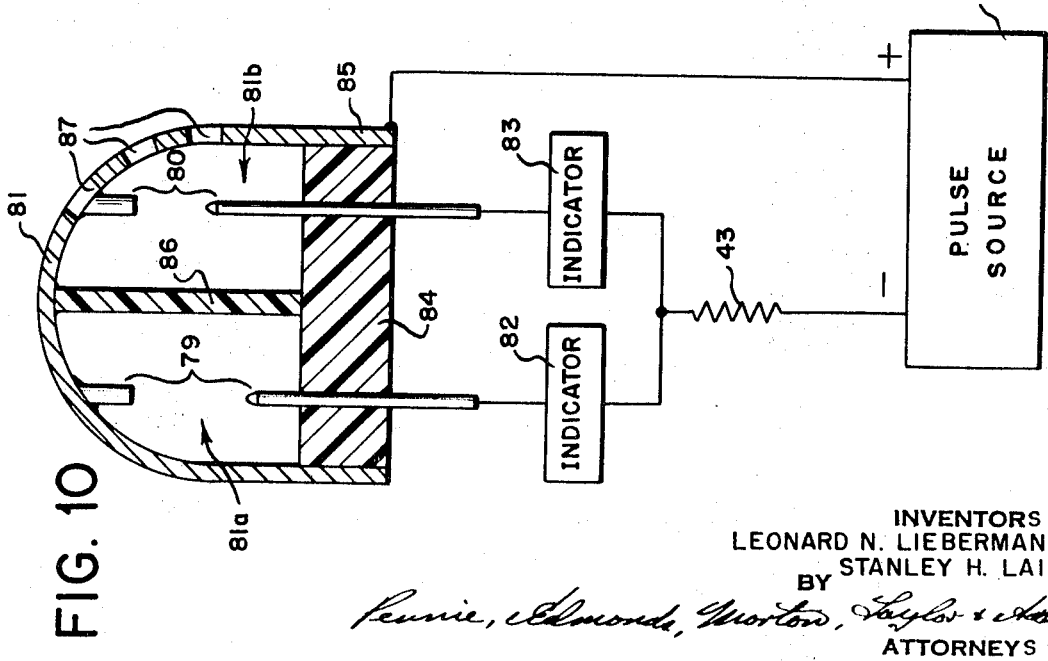
INVENTORS
LEONARD N. LIEBERMANN
STANLEY H. LAI
BY
ATTORNEYS United States Patent Office  3,559,049
Patented Jan. 26, 1971

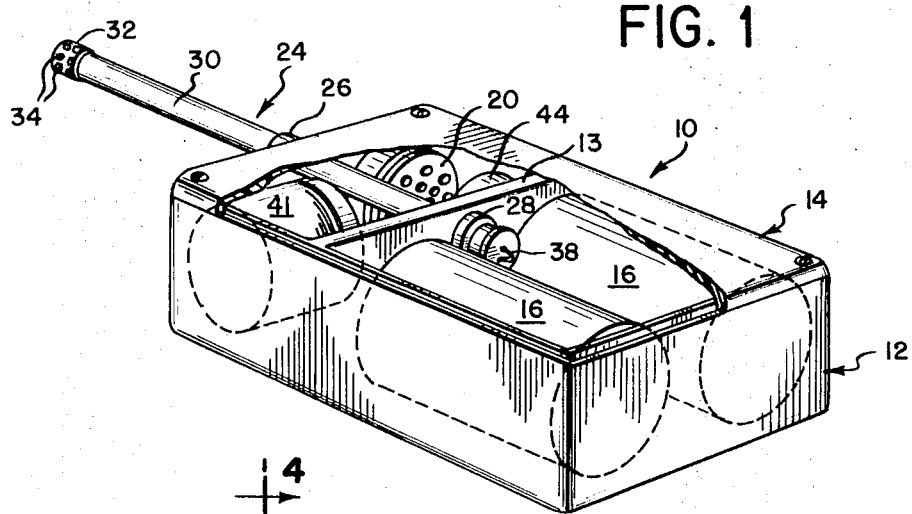
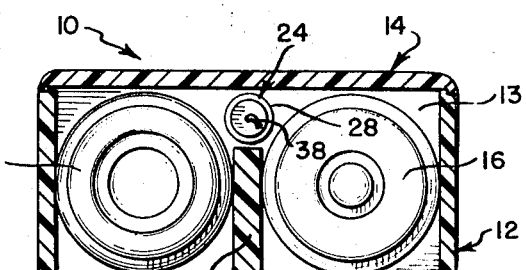
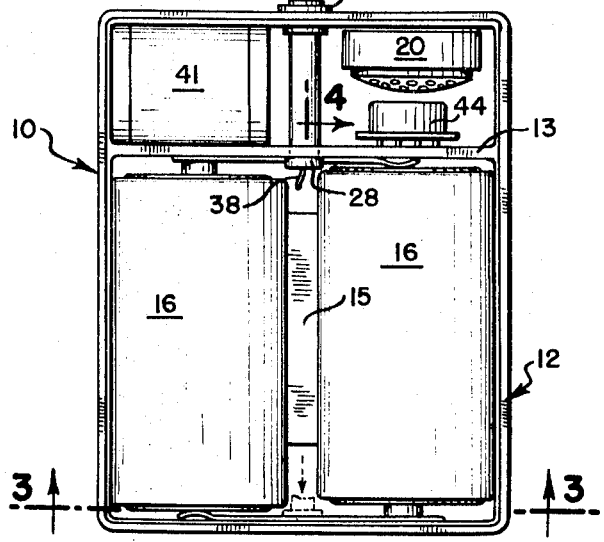
INVENTORS
LEONARD N. LIEBERMANN
STANLEY H. LAI

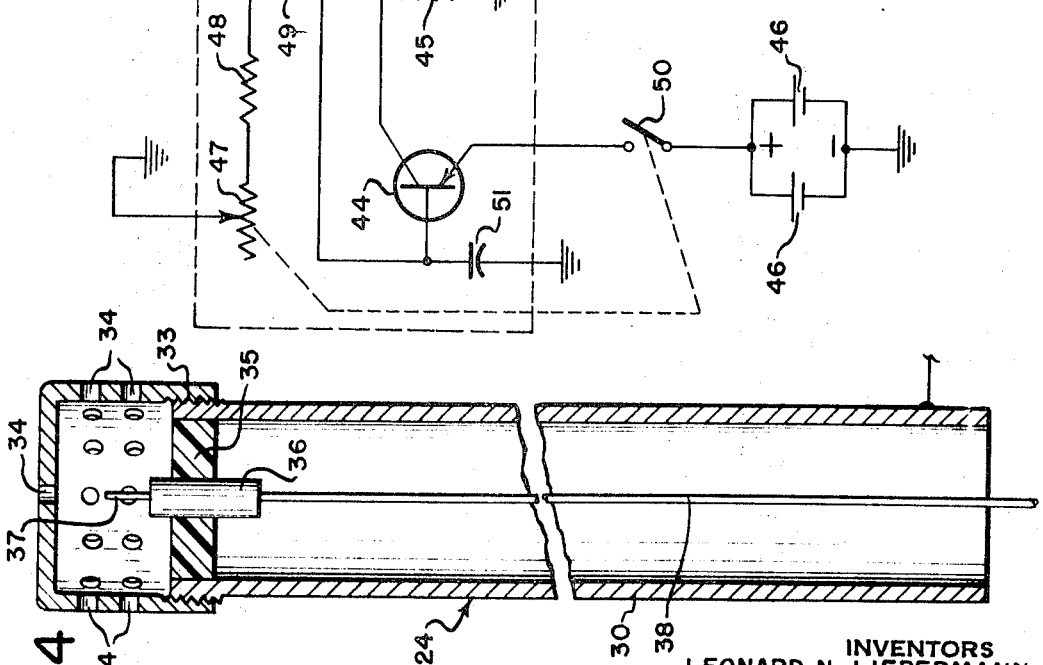

3,559,049
METHOD AND APPARATUS FOR DETECTING GASEOUS IMPURITIES IN ACCORDANCE WITH CHANGES IN SPARK BREAKDOWN POTENTIAL CAUSED THEREBY
Leonard N. Liebermann, 2644 Ellentown Road, La Jolla, Calif. 92037, and Stanley H. Lai, 4164 Hill St., San Diego, Calif. 92107
Continuation-in-part of application Ser. No. 636,352, May 5, 1967, now Patent No. 3,460,125, dated Aug. 5, 1969, which is a continuation-in-part of abandoned application Ser. No. 417,385, Dec. 10, 1964. This application July 2, 1968, Ser. No. 742,075.
Int. Cl. G01n 27/62
U.S. Cl. 324—33
15 Claims

ABSTRACT OF THE DISCLOSURE

A low intensity spark discharge is periodically ignited and extinguished in a given atmosphere by applying voltage pulses across one or more pairs of electrodes disposed in the given atmosphere, which pulses have amplitudes sufficient to cause a low intensity spark discharge to occur across one of the pairs of electrodes in the presence of substantially all concentrations in the given atmosphere of gaseous impurities to be detected. A detector detects changes in the maximum electrode voltage occuring during the low intensity spark discharges from the maximum electrode voltage in the absence of gaseous impurities, which changes correspond to the presence of gaseous impurities in the given atmosphere. In one preferred embodiment of the invention, the detector includes a voltage-sensitive switch actuable by a change of more than a predetermined magnitude in the maximum electrode voltage from its value in the absence of gaseous impurities. In another embodiment, the detector includes a peak-reading voltmeter, enabling the impurity concentration to be read directly. In a further embodiment of the invention, changes in the maximum electrode voltage are converted into variations in the frequency of the voltage pulses applied to the electrodes, which frequency variations are used to indicate the presence of impurities. In a further embodiment, two pairs of electrodes are provided and a change in the maximum electrode voltage is detected by the transfer of the discharge from one electrode pair to the other.

CROSS REFERENCE

This is a continuation-in-part of application Ser. No. 636,352, filed May 5, 1967 (issued Aug. 5, 1969 as Pat. No. 3,460,125), which in turn is a continuation-in-part of application Ser. No. 417,385, filed Dec. 10, 1964, now abandoned.

BACKGROUND OF THE INVENTION

(1) Field of the invention

This invention relates generally to a method and apparatus for electrically detecting the presence of gaseous impurities in a given atmosphere. Although applicable to the detection of any gaseous impurity (or substance which behaves like a gaseous impurity) having a dielectric breakdown potential materially different from that of the given test atmosphere, the invention is particularly useful for detecting leaks of refrigerant compounds from refrigeration equipment or other machinery utilizing halogen compounds for heat transfer or absorption. Particularly because the halogen compounds used in such equipment are sometimes toxic, any such detector should be highly reliable and capable of detecting even minute traces of halogens. A halogen is defined herein as any compound having a least one halogen atom and which is capable of existing in the gaseous phase.

(2) Description of the prior art

Normally, the presence of halogen gas is detected by various types of apparatus which utilize chemically produced flames, or more simply by measuring any drop in pressure in a system in which it is desired to detect halogen leakage. The latter method is quite insensitive and is practical only for the detection of large leaks.

The former method is carried out generally using a burner, a copper plate reactor and an exploring hose. The burner is supplied with acetylene gas or pressurized alcohol to produce a flame, which heats the copper reactor plate to incandescence. Atmosphere suspected of containing halogen vapor is drawn by injector action through the exploring hose into the burner, where it passes over the heated copper reactor plate. If there is a trace of halogen vapor present, the color of the burner flame will change from blue to green as the halogen vapor comes in contact with the copper plate. While this method is quite effective, it requires considerable apparatus and is hazardous to use due to the presence of an open flame in a potentially combustible atmosphere. A method for electrically detecting halogen vapor is known in which the vapor is conducted into the vicinity of a high intensity electrical spark or arc across two electrodes, at least one of which is copper. The copper electrode is heated by the discharge and acts similarly to the copper reactor plate in the above-mentioned device, detection being evidenced by a color change. This apparatus is also cumbersome, and the high temperature arc is even more hazardous than the burner flame.

A further known method of halogen detection is to generate a sustained electric discharge, or arc, between two electrodes and to monitor the current through or the voltage across the electrodes. Because the discharge impedance (herein defined as the ratio of applied electrode voltage to discharge current during spark discharge) of a gas mixture depends upon its composition, the presence of gaseous impurities is detectable by noting changes in the discharge impedance.

Detection of impurities by this technique may be carried out using either direct current or alternating current to sustain the discharge. Under either condition, gas atoms sustaning the discharge remain continuously ionized, because (1) in the D.C. case, ionizing potential is always present, and (2) the high levels of alternating current heretofore proposed have produced discharges at energy levels too high to permit extinguishment of the arc, and dissipation of electron clouds in the region of the discharge, between cycles of the current waveform. In addition, the high current levels produced electrode heating, with consequent thermionic ionization persisting between cycles.

Detectors which measure changes in discharge current or the voltage associated therewith are usually relatively insensitive, because discharge current itself is not highly sensitive to changes in gas composition, and such detectors have tended to be cumbersome and complex to use. Moreover, they have suffered from deterioration or contamination of the electrodes supporting the discharge, which causes changes in the discharge impedance and, consequently, erroneous detection.

SUMMARY OF THE INVENTION

This invention provides a method and apparatus for detecting the presence in a given atmosphere of gaseous impurities having dielectric breakdown potentials different from that of the given atmosphere. In the previous copending applications of which this application is a continuation-in-part, apparatus was described for periodically applying voltage pulses across a pair of electrodes disposed in the given atmosphere, which voltage pulses have peak amplitudes slightly different from the dielectric breakdown potential $V_b$ of the given atmosphere. The presence of a low intensity spark discharge between the pair of electrodes is detected by a detector, which initiates a signal indicative thereof. By this means changes in the dielectric breakdown potential of the given atmosphere, due to the presence of such gaseous impurities, are detected by the failure to ignite, or the ignition of, a low intensity spark discharge corresponding to each of the applied voltage pulses. In particular, the prior copending applications disclosed apparatus and method for detecting gaseous impurities having dielectric breakdown potentials greater than that of the given atmosphere to be tested with extreme sensitivity, by periodically igniting and extinguishing a low intensity spark discharge between two electrodes in the given atmosphere. Cessation of the periodic discharge was detected, caused by the elevation of $V_b$ due to the presence of the gaseous impurity. Note that while the "cessation" of the periodic discharge is referred to, from the point of view of each applied voltage pulse the discharge does not cease, but actually fails to ignite.

According to the present invention, apparatus is provided for periodically applying voltage pulses across one or more pairs of electrodes disposed in the given atmosphere, the amplitudes of the voltage pulses being sufficiently greater than the dielectric breakdown potential $V_b$ of the given atmosphere to cause spark breakdown to occur in the presence of substantially all concentrations of such gaseous impurities to be detected. The discharge current flowing between the electrodes is limited to a low intensity spark discharge. During the initial portion of the low intensity spark discharge resulting from each voltage pulse applied across the electrodes, the electrode voltage is at a maximum (herein referred to as the maximum electrode voltage) and is equal to the dielectric breakdown potential of the atmosphere under test. A detector is provided for detecting changes in the maximum electrode voltage from its value in the absence of impurities, which changes indicate the presence of impurities.

The dielectric breakdown potential $V_b$ of a gas, as used herein, is that potential applied between two electrodes disposed in the gas at which spark breakdown occurs.

Because there has been in the past a great deal of confusion and misunderstanding regarding the various mechanisms occurring in gas discharges and the several thresholds observed in such discharges, and because such misunderstanding has led to confusion in the nomenclature used to describe such discharges, reference is made for definitional purposes to a relevant and comprehensive work by Leonard B. Loeb entitled "Electrical Coronas, Their Basic Physical Mechanisms." Loeb describes such various thresholds and breakdown characteristics as follows, at page 5:

"Except at relatively low pressures, the luminous manifestations at the highly stressed electrode [in a non-uniform field] near the threshold for the low currents take on various characteristic shapes, such as flows, multiple spots, haloes, coronas, brushes, streamers, etc. In consequence, these luminous manifiestations gave to the phenomena the general name coronas. * * * This expression, corona, will be used to describe the general class of luminous phenomena appearing associated with the current jump to some microamperes at the highly stressed electrode preceding the ultimate spark breakdown of the gap. Where observed, the sudden current jump, usually just preceding the initial appearance of the corona and the associated value of the potential, will be designated as the corona threshold. The threshold for the appearance of a corona form may be further classified in terms of the characteristic phenomenon or mechanisms associated with it, such as the burst pulse threshold, the streamer threshold, the Trichel pulse threshold, or the glow discharge threshold. The current at many such thresholds is pulsating or intermittent in nature. Depending on the geometry and the spectroscopic nature of the gas, the intermittent or pulsed thresholds may not show luminosity in all cases. If the potential is raised on the order of some hundreds of volts above threshold, the frequencies of the intermittent pulses become so great that they merge to a nearly steady but slightly fluctuating current. Transition from intermittent to the steady state is sometimes sharp and is described as the onset of steady corona. Above the onset of steady corona there will be a limited region, in which current increases nearly proportional to potential increase. This is called the ohm's law regime. After this the current increases more rapidly than potential, that is, parabolically, eventually leading to a complete spark breakdown, which will be so designated."

It is particularly important to distinguish between the corona discharge and spark breakdown. It has been shown (Mohr and Weissler, Physical Review, vol. 72, No. 4, Aug. 15, 1747, pp. 294–297) that the onset of corona discharge in air, unlike spark breakdown, is unaffected by the presence of halogens. Thus the corona discharge is not used in this invention. The discharge utilized is a "low intensity" spark discharge, defined as a spark discharge which is not so intense (i.e. produced by such a high current level) as not to be extinguished, and space charges in the vicinity of the discharge dissipated, between successive voltage pulses. In the particular devices described herein, the peak spark discharge current is on the order of a few tenths of a milliampere, and generally will be less than about 0.5 milliamperes.

The breakdown potential of a gas and its discharge impedance (defined above) are two distinct and totally unrelated properties, which pertain in the gas under mutually exclusive conditions. Further, once spark breakdown has occurred and ionization current has begun to flow, lowering the applied voltage below the breakdown point will not extinguish the discharge until a substantially lower voltage is reached.

In one embodiment of the device described herein, the detector includes a voltage sensitive switch actuable by a change in the maximum electrode voltage from its value in the absence of gaseous impurities, and an indicator responsive to actuation of the voltage sensitive switch for indicating the presence of gaseous impurities. The voltage sensitive switch may be connected so as to be actuated by a reduction or by an increase in the maximum electrode voltage of more than a predetermined magnitude depending on whether it is desired to detect impurities having lower or higher dielectric breakdown potentials than that of the given atmosphere.

In another embodiment of the device, the detector includes a peak reading volt meter for measuring the maximum electrode voltage. This embodiment is capable of detecting impurities which have either higher or lower dielectric breakdown potentials than that of the given atmosphere.

In another embodiment of the invention described herein, the igniting means which periodically applies voltage pulses to the electrodes is capable of producing pulses at a variable frequency and is responsive to changes in the maximum electrode voltage for varying its repetition frequency. Changes in this frequency are detected, corresponding to the existence of gaseous impurities. In a particularly advantageous embodiment, a reference oscillator is provided and its output signal is mixed with the electrode signal in a mixer to generate a beat frequency, changes in which may be detected with relatively high sensitivity.

In another embodiment of the invention, a plurality of pairs of electrodes are provided and changes in the dielectric breakdown potential of the atmosphere under test are detected as transfers of the low intensity spark discharge from one electrode pair to another, indicating changes in maximum electrode voltage.

BRIEF DESCRIPTION OF THE DRAWINGS

The invention will be described in conjunction with the accompanying drawings, in which:

FIG. 1 is a diagrammatic view in perspective of one embodiment of the invention;

FIG. 2 is a plan view of the embodiment of FIG. 1, with the top cover removed;

FIG. 3 is an end elevation taken on the line 3—3 of FIG. 2;

FIG. 4 is a plan view partly in cross section showing certain aspects of the invention;

FIG. 5 is a schematic circuit diagram of an embodiment of the invention which includes a voltage sensitive switch;

FIG. 10 is a schematic diagram of an embodiment of the invention which includes more than one pair of electrodes;

FIG. 11 is a graph of the electrode potential $v_e$ as a function of time for the embodiments described herein with respect to FIGS. 5 through 8; and FIG. 12 is a graph showing $v_e$ as a function of time for the embodiment described herein with respect to FIG. 9.

DESCRIPTION OF THE PREFERRED EMBODIMENTS

Figure 6:
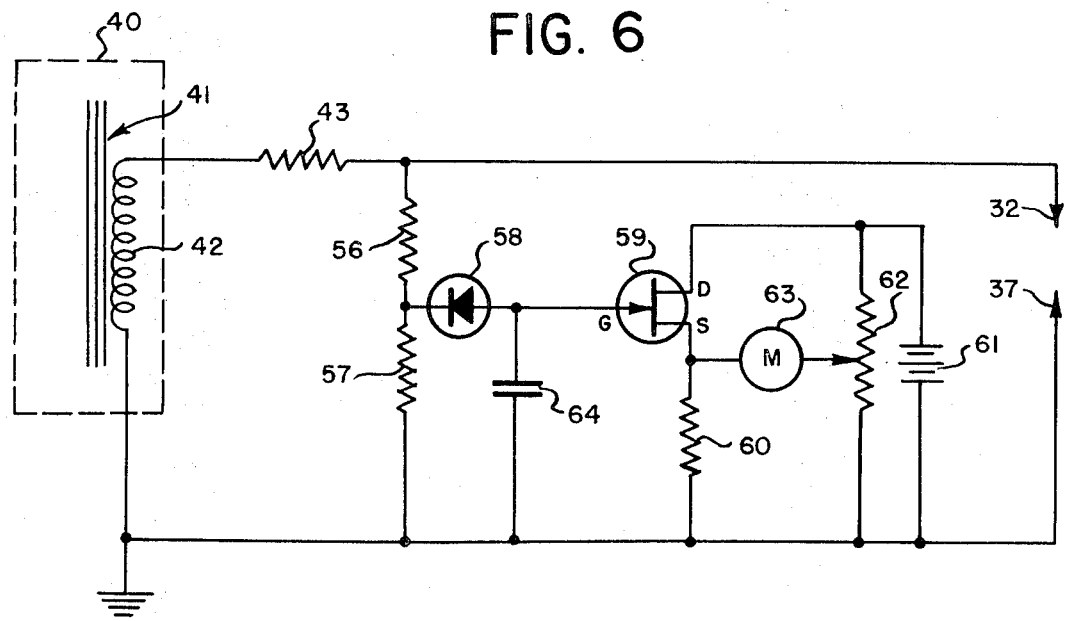
FIG. 6 is a schematic diagram of an embodiment of the invention in which the detector includes a peak reading voltmeter.

With reference to FIGS. 1–4, wherein like characters denote like parts throughout, a leak letector 10 comprises a hollow casing 12 with a cover 14 enclosing electric batteries 16, an induction coil or transformer 41, an indicator 20 (shown as a speaker), a transistor 44, a probe 24 and other circuit elements, not shown.

The casing 12 may be provided with partitions 13 and 15 to separate the batteries 16 from the other parts and from each other. Strap and lead connectors are provided interiorly of the casing to establish the circuit shown in any of FIGS. 5 through 10 (the last of which requires an additional probe, as will be seen.) The end of the casing 12 from which the probe 24 extends, and the partition 13, are apertured and provided with bushings 26 and 28, respectively, constructed to slidingly receive the probe 24. The bushings may be of rubber or other resilient material and are of sufficient diameter to receive the telescopic probe and still provide some friction preventing easy movement of the probe therethrough.

The probe 24, as shown in FIG. 4, comprises a metallic tubular casing or sheath 30 surmounted by an adjustable apertured metallic cap 32. Since the outer end of the probe is externally threated and the cap is internally threaded to match, as indicated at 33, the cap 32 may be adjusted longitudinally to closely regulate the electrode separation, as will be more fully explained. Marking indicia (not shown) may be provided for indicating exactly the position of the cap 32 with respect to the outer end of the probe sheath 30. The cap 32 is further provided with radial and longitudinal apertures 34 for the reception of halogen vapor.

Internally of the outer end of the probe casing 30, an insulating disc 35 is disposed to mount an electrode support 36, which may be formed of any electrically conductive material, such as copper or silver. A fine wire electrode 37 extends longitudinally outward from its support 36. The electrode 37 may be of platinum or other durable metal which will not react with the atmosphere to be tested. Its length is sufficient to reach fairly closely to the underside of the transverse portion of the cap 32. The actual distance between the two may then be closely regulated by adjusting the cap inwardly or outwardly as desired. Alternatively, the electrode constituted by the metallic cap 32 may have a small tab (similar to that forming the negative electrode of an automotive spark plug) bent inwardly from the end surface of the cap 32 and extending toward the other electrode 37. The internal volume of the electrode housing, (i.e. that part of the interior of the probe between the cap 32 and the disc 35) is preferably made relatively small, so that a minimum amount of air mixes with the impurity vapor to be detected as the probe is moved through the atmosphere in which a leak is suspected, thereby rendering the device highly sensitive. For example, the electrode housing may be ⅛ inch long and ⅛ inch in diameter.

One reason for the increased sensitivity of this device in comparison with those formerly known is the construction of the probe 30, which allows the spark discharge to be placed in close proximity to any leak. Prior devices generally mixed relatively large volumes of air with the impurity gas in exploring tubes, making the impurity gas harder to detect. Further, because the insulator 35 inhibits gross currents of air (and other ambients) along the axis of the electrode 37, the sensitivity of the device is substantially improved. In addition, the sensitivity of the device is enhanced by making the electrode housing of metal rather than glass, or other non-conducting material, as has been previously suggested.

It has been found, with respect to the pair of electrodes supporting the spark discharge, that if at least one electrode consists essentially of zirconium, the electrodes do not foul and cause the device to misfire, as has been found to happen with virtually all other electrode materials. It is not necessary that the zirconium used by absolutely pure; commercially pure grades have proven satisfactory. If only one electrode, rather than both, are zirconium, it should be the more sharply pointed one, which in the above described embodiments is the negative electrode.

The housing structure of the invention described with respect to FIGS. 1–4 may contain any one of the circuits shown in the remaining figures. The embodiment of the invention shown in FIG. 5 includes igniting means connected in circuit with a pair of electrodes for periodically applying thereto voltage pulses having amplitudes sufficient to cause spark breakdown to occur in the presence of substantially all concentrations of gaseous impurities to be detected. The igniting means limits current flow through the electrodes to a low intenstiy spark discharge. A detector is provided for detecting changes in the maximum electrode voltage occurring during the low intensity spark discharge, which includes a voltage sensitive switch actuable by a change in the maximum electrode voltage from its value in the absence of gaseous impurities. Some form of indicator may be provided which is responsive to actuation of the voltage sensitive switch for indicating the presence of gaseous impurities. In particular, the igniting means includes a blocking oscillator 40 having an output transformer 41, the secondary winding 42 of which is connected through a limiting resistor 43 in circuit with the pair of electrodes 32 and 37. The polarity of the blocking oscillator is such that the negative-going pulses are applied to the sharply pointed electrode 37. The limiting resistor 43 must be sufficiently large to limit current flow through the electrodes to a low intensity spark discharge. In the particular embodiment shown, the value of resistor 43 is about 50 KΩ.

The blocking oscillator 40 includes a transistor 44, the output of which is taken between its collector and emitter terminals and is applied across an input winding 45 of output transformer 41. D.C. current is supplied by batteries 46 through a variable resistor 47, fixed resistor 48, fedback winding 49, and a switch 50 to the emitter-base junction of the transmitter, which is shunted by a capacitor 51. Thus, the output voltage of the blocking oscillator 40 may be controlled by adjusting variable resistor 47. This makes it unnecessary to use a probe having adjustable electrode spacing, allowing the use of less expensive fixed electrodes.

The blocking oscillator 40 has a low duty cycle which results in the output waveform having a high-amplitude, negative-going pulse and a low-amplitude, positive-going pulse. In addition, the very short negative pulse (about 1 millisecond) results in a low average power dissipation in the discharge, so that the electrode temperature is kept low, as is desirable for reasons previously stated.

The detector includes a fixed resistor 52 and a variable center tap resistor 53 connected in series across the electrodes. The center tap of resistor 53 is connected to a voltage sensitive switch, the remaining terminal of which is connected to ground. Variable resistor 53 permits adjustment of the portion of the electrode voltage which appears across the voltage sensitive switch 54, thus permitting adjustment of the threshold sensitivity of the detector.

The voltage sensitive switch 54 may be any one of a number of known non-linear devices which are capable of signaling the presence of a voltage across them (or current through them) of over (or under) a predetermined threshold magnitude. The voltage sensitive switch may be a neon lamp, for example, or its solid state analog, the Zener diode. Alternatively, a silicon-controlled rectifier may be used, which has the advantage of being a "latching" device; that is, once actuated, it remains actuated even though the triggering voltage drops below the threshold level, until it is turned off. The output of the voltage sensitive switch may be applied to any convenient type of indicator such as a lamp, or an audible signal generator, for example.

The graph of FIG. 11 is a plot of the electrode voltage $-v_e$ as a function of time, the electrode pulse repetition rate being about 60 cycles per second. The pulse repetition rate should be sufficiently rapid so that, in use, the apparatus will not fail to detect a gaseous impurity present in a small space, for example. The output of blocking oscillator 40 is adjusted to have an amplitude sufficient to cause breakdown to occur in the presence of substantially all concentrations of gaseous impurities to be detected. The output voltage should ordinarily be at least several hundred volts higher than the dielectric breakdown voltage $V_b$ of the given atmosphere in the absence of impurities. The output voltage of the blocking oscillator 40, which appears across output winding 42, is equal, in the absence of discharge, to the electrode voltage, i.e. the voltage across the electrodes 32, 37.

As shown in FIG. 11, when $V_b$ is raised by the existence in the given atmosphere of impurities to $V_b^1$, the maximum electrode voltage, which is always equal to the dielectric breakdown potential of the atmosphere under test, increases commensurately. A voltage proportional to the electrode voltage (the proportionality being that of the voltage divider formed by resistors 52 and 53) appears across the voltage sensitive switch 54, and when this voltage becomes equal to the threshold or triggering voltage of the voltage sensitive switch, even for an instant, the switch emits a signal at its output 55, which causes an indicator (not shown) to indicate the presence of an impurity. Note that if the indicator is a lamp or similar directly actuated device, it will be repetitively actuated, in the presence of an impurity, at a rate equal to the discharge repetition rate. If desired, the switch output signal may be applied across a capacitive circuit having a long time constant compared to the discharge repetition rate, so that a steady signal results.

If it is desired to detect, with this embodiment, gaseous impurities which have dielectric breakdown potentials lower than that of the given atmosphere, so that their presence causes a lowering of $V_b$ to $V_b^{11}$, then the voltage sensitive switch output 55 may be connected to bias an indicator off, so that when a reduction in $V_b$ causes a lowering of the voltage across the voltage sensitive switch to less than its threshold voltage, cessation of the off-bias signal at output 55 permits the indicator to register the existence of the impurity. Alternatively, two voltage sensitive switches having different threshold voltages and connected to respective indicators may be connected in parallel to indicate the presence of gaseous impurities which raise, as well as those which lower, the dielectric breakdown potential of the given atmosphere. The threshold or triggering levels of voltage sensitive switches should be chosen (and/or the center tap of variable resistor 53 should be adjusted) such that spurious indications by the device will be avoided, and yet good sensitivity will be achieved.

It will be apparent that blocking oscillator 40 may be replaced by any device capable of generating a waveform meeting the conditions described above, such as the waveform shown in FIG. 11.

In the embodiment of FIG. 6, the detector includes a peak-reading voltmeter as opposed to a voltage sensitive switch. This permits the detection of impurities having both higher and lower breakdown potentials than that of the given atmosphere, and also permits a direct reading of the concentration of a known impurity by calibrating the voltmeter output scale in terms of such concentration. The igniting means in FIG. 6 is shown in block form as a blocking oscillator 40, and may be any type of device such as is described above with respect to the embodiment of FIG. 5. The igniting means includes an output winding 42 connected across a pair of electrodes 32 and 37 through a limiting resistor 43, which limits the electrode current to a low intensity spark discharge. (Note that the same reference numerals are used in each figure to denote like elements.)

The detector in FIG. 6 includes resistors 56 and 57, between which a voltage proportional to the electrode voltage is tapped off and applied through diode 58 to the control grid of a field effect transistor 59 (F.E.T.). The source and drain terminals of the F.E.T. are connected through a resistor 60 across the terminals of a battery 61. A resistor 62 having a variable center tap is connected in parallel with the battery and a voltmeter 63 is connected between the center tap and the source terminal of the F.E.T. A capacitor 64 is connected in parallel with the input of the F.E.T. and is made small enough so that each pulse of electrode voltage charges the capacitor 64 to a voltage proportional to the maximum electrode voltage $v_{e\ max}$, with the proportionality K being that determined by resistors 56 and 57. The high input impedance of the F.E.T. (which is biased to operate in its linear amplifying region) serves to maintain capacitor 64 charged at a votage equal to $Kv_{e\ max}$. The center tap of resistor 62 is adjusted so that in the absence of gaseous impurities, meter 63 (which may be an ordinary D.C. voltmeter) reads 0, or some convenient reference. The presence of gaseous impurities having dielectric breakdown potentials higher than that of the given atmosphere, by increasing $v_{e\ max}$, increase the voltage across resistor 60, as indicated by meter 63. Impurities having lower dielectric breakdown potentials than that of the given atmosphere lower the voltage across resistor 60 in a similar manner as indicated by a movement of the needle of meter 63 in the opposite direction. The detector may alternatively include any other type of peak-reading voltmeter.

Figure 7:
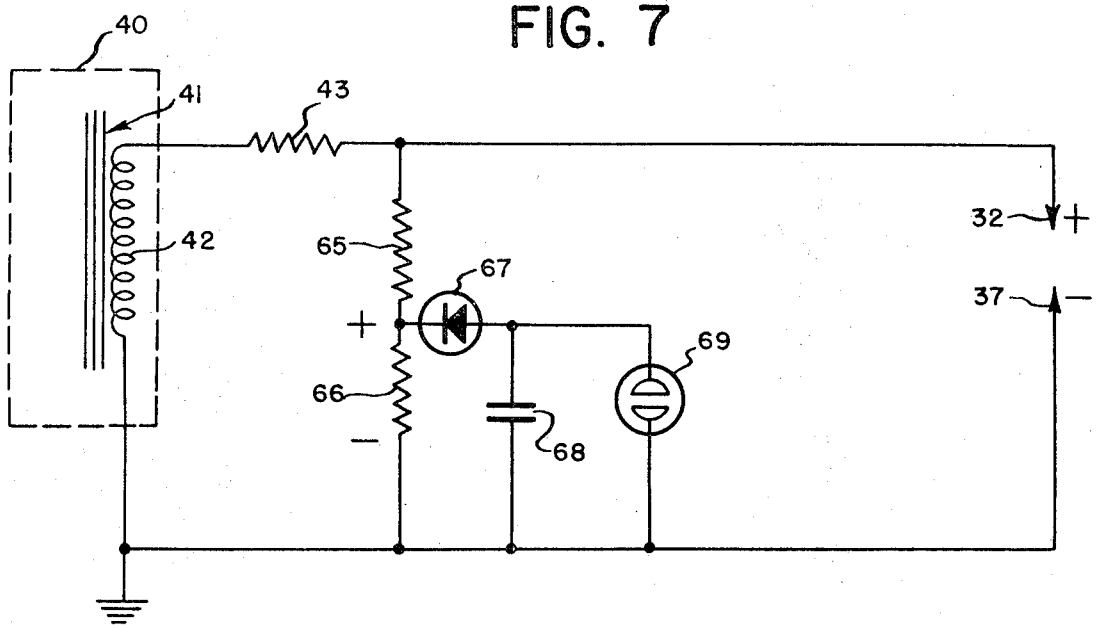
FIG. 7 is an embodiment of the invention in which the detector includes a neon lamp.

The embodiment of the invention shown in FIG. 7 includes an igniting means similar to that described with respect to FIGS. 5 and 6. The detector includes a voltage divider formed of resistors 65 and 66 having a divider ratio $K_1$ for applying a voltage having a peak value equal to $K_1 v_{e\ max}$, through a diode 67, across a capacitor 68 in parallel with a neon lamp 69. Capacitor 68 is made large enough so that the time constant of it and the resistance of resistor 65 is several times longer than the repetition rate of the electrode voltage. Assuming a constant maximum electrode voltage, each electrode current pulse will cause an increase in the voltage across capacitor 68, the value of this increase being proportional to the maximum electrode voltage $v_{e\ max}$. After a number $n$ of such pulses, capacitor 68 will be charged to the firing voltage of neon lamp 69 and will discharge, igniting the lamp. The firing rate of neon lamp 69 will therefore $1/n$ times the firing rate of the electrode pulses, for constant $V_{e\,max}$. An increase in $V_{e\,max}$, by increasing the charge deposited on capacitor 68 for each electrode pulse, increases the firing rate of neon lamp 69, while a decrease in $V_{e\,max}$ correspondingly decreases the firing rate of neon lamp 69, thereby indicating the presence of either type of impurity. It has been found that changes in frequency of neon lamp 69 corresponding to the presence of relatively small amounts of impurities can be detected readily for flashing frequencies on the order of about two times per second.

Figure 8:
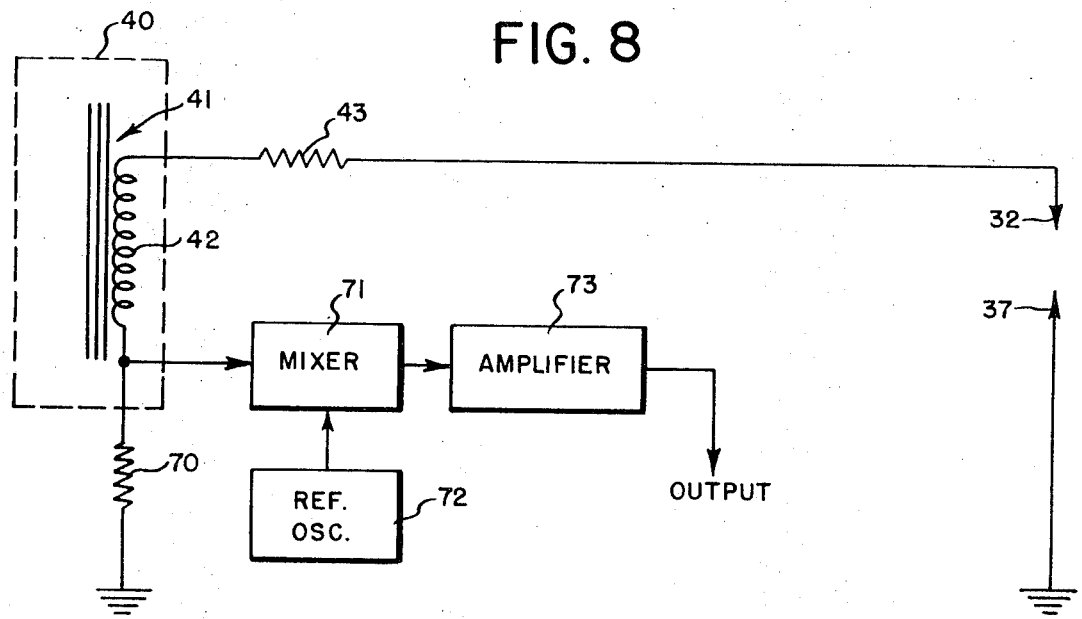
FIG. 8 is a schematic circuit diagram of an embodiment of the invention in which the igniting means supplies electrode pulses at a rate which varies according to the maximum electrode voltage.

FIG. 8 illustrates an embodiment of the invention in which a reference resistor 70 is included in the igniting circuit, the electrode pulse source being a blocking oscillator 40. It has been found that small variations in the maximum electrode voltage $V_{e\,max}$ result in detectable shifts in the frequency of blocking oscillator 40, which shifts correspond to the presence of gaseous impurities. These changes in frequency are sensed by a detector which includes a mixer 71 connected to receive pulses developed across resistor 70 at one input and pulses from a reference oscillator 72 at another input. The frequency of reference oscillator 72 is selected to be close to the frequency of blocking oscillator 40. The output of mixer 71 is therefore a beat, or difference frequency which varies more rapidly than the frequency of blocking oscillator 40 for given changes in impurity concentration and consequently permits more accurate detection. The output of mixer 71 is amplified by an amplifier 73, the output of which may be detected in any convenient manner. If the output of amplifier 73 is connected directly to a speaker, for example, the frequency shift corresponding to the presence of impurities may be audibly detected. In this embodiment, an impurity concentration of 5 p.p.m., of $CCl_3F$ changes the electrode pulse frequency by 2%, which shift is readily detected by means of the reference oscillator and mixer.

Figure 9:
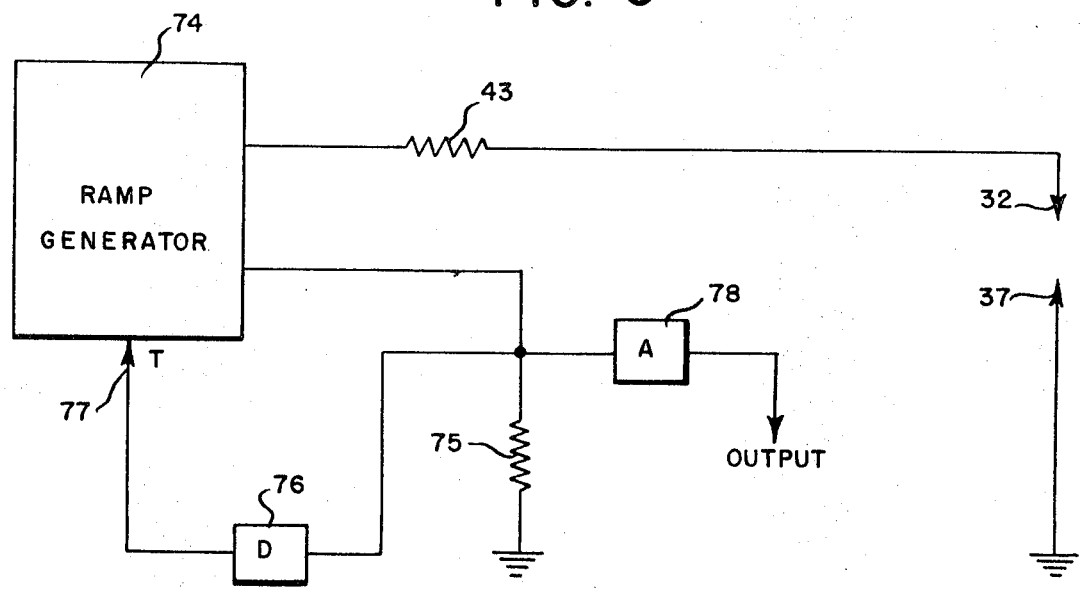
FIG. 9 is a schematic circuit diagram of an embodiment of the invention similar to that shown in FIG. 8.

FIG. 9 illustrates an embodiment of the invention similar to that of FIG. 8. The igniting circuit of this embodiment includes a monostable ramp generator 74 connected across the pair of electrodes through a limiting resistor 43 and a reference resistor 75. The waveform of ramp generator 74 is shown in FIG. 12. The peak amplitude of the ramp generator is made large enough with respect to $V_b$ so that spark breakdown occurs for substantially all impurity concentrations to be detected. Each time a ramp function is generated by ramp generator 74, the voltage $v_e$ rises until it is equal to the dielectric breakdown potential of the atmosphere under test. This causes a low intensity spark discharge to occur, and the discharge current develops a voltage across resistor 75 which is fed back through a delay element 76 to the trigger input 77 of ramp generator 74 causing it to generate an additional ramp signal. It will be apparent that if the dielectric breakdown potential $V_b$, and consequently $V_{e\,max}$, are increased or decreased by the presence of impurities, the period of the ramp generator output will be correspondingly increased or decreased. Time delay element 76 may be inserted in the trigger input to lower the duty cycle of the ramp generator, if desired. The duty cycle may alternatively be controlled by proper selection of the slope of the ramp function. Changes in the electrode pulse repetition rate may be detected directly by amplifying the signal devoted across reference resistor 75 in amplifier 78; alternatively, better sensitivity may be obtained by employing the detector shown in FIG. 8.

FIG. 10 illustrates an embodiment of the invention in which changes in the maximum electrode voltage are detected by the shift of the discharge from one electrode pair to another. For detecting gaseous impurities having dielectric breakdown potentials greater than that of the given atmosphere, a first pair of electrodes is disposed in a housing containing the given atmosphere free of any such impurities, and a second pair of electrodes is disposed in a housing exposed to the given atmosphere along with any impurities contained therein. The first and second pairs of electrodes are made such that the given atmosphere has a higher dielectric breakdown potential with respect to the first pair of electrodes than with respect to the second pair of electrodes. Igniting means is connected in circuit with both pairs of electrodes for periodically applying thereto voltage pulses having amplitudes sufficient to cause spark breakdown to occur across one pair of electrodes in the presence of substantially all concentrations of gaseous impurities to be detected, and a detector is provided for indicating whether a low intensity spark discharge is occurring across the first pair of electrodes or the second pair of electrodes, thereby indicating the presence of gaseous impurities. The igniting means in this embodiment includes a pulse source such as blocking oscillator 40 connected through a limiting resistor 43 across two electrode pairs 79 and 80 connected (along with indicators 82 and 83) in parallel and mounted in a common housing 81. Indicators 82 and 83, which may be neon lamps or any other comparable devices, are connected in series with each of the electrode pairs 79 and 80 for indicating the existence of a low intensity spark discharge through the corresponding electrode pair. Electrode pair 79 is maintained in a closed chamber 81a formed by a base 84 made of an electrically insulating material and a metal shell 85 mounted on the base. The chamber is sealed by a plastic partition 86, which forms one wall of a second chamber 81b within which electrode pair 80 is disposed. Ventilating holes 87 are disposed in the metal shell 85 to permit air flow through the chamber enclosing electrode pair 80, which is constructed to have a gap width slightly less than that of electrode pair 79. Alternatively, the pairs of electrodes may be constructed in any other way which assures that the given atmosphere (for instance) has a higher dielectric breakdown potential with respect to electrode pair 79 than with respect to electrode pair 80.

Changes in the maximum electrode voltage $v_{e\,max}$ are detected in this embodiment of the invention in the following manner. The pulse source constituted by blocking oscillator 40 supplies pulses such as are shown in FIG. 11 to both pairs of electrodes 79 and 80. In the absence of impurities, each pulse produces a low intensity spark discharge through electrodes 80, since both electrode pairs are disposed in the same atmosphere and since the dielectric breakdown potential $V_{b1}$ of that atmosphere with respect to electrode pair 80 is lower than the dielectric breakdown potential $V_{b2}$ of the atmosphere with respect to electrode pair 79 due to the closer spacing of the former. Introduction of gaseous impurities having a dielectric breakdown potential higher than that of the given atmosphere through vents 87 increases the dielectric breakdown potential $V_{b1}$ of the atmosphere in the vented chamber; when the impurity concentration is such that $V_{b1}$ is greater than $V_{b2}$, the discharge will shift from electrode pair 80 to electrode pair 79, which shift is indicated by indicators 82 and/or 83. When the discharge shifts to electrode pair 79, since the voltage between the electrodes is limited to $V_{b2}$, the voltage across electrode pair 80, connected in parallel with it, is also limited to $V_{b2}$; consequently, discharge ceases through electrodes 80 since the voltage across them never reaches the dielectric breakdown potential for that electrode pair.

If it is desired to detect gaseous impurities having dielectric breakdown potentials lower than that of the ambient then the same structure as is shown in FIG. 10 may be used, with the exception that the electrode pair having the narrower gap is placed in the closed chamber, and the electrode pair having the wider gap is placed in the vented chamber. With this arrangement, in the given atmosphere, ignition takes place across the narrow-gap electrodes in the closed chamber. Introduction of gaseous impurities into the vented chamber lowers the dielectric potential of the atmosphere in that chamber with respect to the electrode pair in it to a value lower than that of the given atmosphere in the enclosed chamber, with respect to the electrode pair therein, at which time the discharge shifts, as described above.

Alternatively, the common housing formed by the insulating base 84, plastic partition 86 and metallic shell 85 may be replaced by a pair of separate housings, one forming a closed chamber and the other forming a vented chamber. Partition 86 as well as the remaining housing structure should be inert with respect to the atmosphere of the closed chamber. The embodiments described above with respect to FIG. 10 are particularly useful for any application involving the comparison of one gaseous atmosphere with another either on a continuous or discrete sample basis. Each of the two electrode pairs may be disposed in one of the gases to be compared, and a shift from one pair to another of the low intensity spark discharge indicates a change in the impurity concentration of one gas relative to the other of more than a predetermined magnitude.

It has been stated that with respect to the embodiments described in FIGS. 5, 6 and 10 that the voltage pulses supplied to the electrode pair are "periodic"; this is not meant to imply that strict periodicity is required, however. If other voltage sources are used equivalent to those shown they may be such that the intervals between pulses are not constant. With respect to the embodiments of FIGS. 7, 8 and 9, it will be apparent that any deviation in the frequency of the electrode pulse waveform must be small compared with the frequency variation produced by gaseous impurities, for proper detection.

It will be apparent that the invention is not limited to the specific features of the above described preferred embodiments and that various modifications may be made without departing from its scope as defined in the claims.

We claim:

1. Apparatus for detecting the presence in a given atmosphere of gaseous impurities having dielectric breakdown potentials different from that of said given atmosphere, comprising:
   at least one pair of electrodes;
   igniting means connected in circuit with said pairs of electrodes for periodically applying thereto voltage pulses having amplitude sufficient to cause spark breakdown to occur across one of said pairs of electrodes in the presence of substantially all concentrations of such gaseous impurities to be detected, said igniting means limiting current flow through said electrodes to a low intensity spark discharge, such discharge being extinguished and permitting space charges in the vicinity of the discharge to be dissipated, between successive ones of said voltage pulses; and
   detecting means for detecting changes in the maximum electrode voltage occurring during such low intensity spark discharges, which changes correspond to the presence of gaseous impurities in the given atmosphere.

2. Apparatus for detecting the presence in a given atmosphere of gaseous impurities having dielectric breakdown potentials different from that of said given atmosphere, comprising:
   a pair of electrodes;
   igniting means connected in circuit with said pair of electrodes for periodically applying across the electrodes voltage pulses having amplitudes greater than the dielectric breakdown potential of said given atmosphere by an amount sufficient for spark breakdown to occur in the presence of substantially all concentrations of such gaseous impurities to be detected, said igniting means limiting current flow through said electrodes to a low intensity spark discharge, such discharge being extinguished and permitting space charges in the vicinity of the discharge to be dissipated between successive ones of said voltage pulses; and
   detecting means for detecting changes in the maximum electrode voltage occurring during such low intensity spark discharges, which changes correspond to the presence of gaseous impurities in the given atmosphere.

3. Apparatus as defined in claim 2 wherein said detecting means includes a voltage-sensitive switch actuable by a change in said maximum electrode voltage of over a given magnitude from its value in the absence of gaseous impurities, and an indicator responsive to actuation of the voltage-sensitive switch for indicating the presence of gaseous impurities.

4. Apparatus as defined in claim 2 wherein said detecting means includes a peak-reading voltmeter connected to provide an indication of the maximum electrode voltage and thereby to indicate the presence in said given atmosphere of gaseous impurities.

5. Apparatus as defined in claim 2 wherein said igniting means applies voltage pulses to said pair of electrodes at a pulse repetition frequency which varies in accordance with the maximum electrode voltage occurring during such low intensity spark discharges, and said detecting means is responsive to changes in said pulse repetition frequency for indicating changes therein corresponding to the presence of gaseous impurities.

6. Apparatus as defined in claim 5 wherein said igniting means includes a blocking oscillator which oscillates at a frequency dependent on said maximum electrode voltage.

7. Apparatus as defined in claim 5 wherein said igniting means includes a monostable waveform generator responsive to a trigger input signal for generating a monotonically increasing voltage waveform, and means responsive to the occurrence of a low intensity spark discharge between said electrodes for supplying a trigger input signal to the waveform generator to initiate a succeeding monotonically increasing voltage waveform, whereby the pulse repetition frequency of the discharge varies in accordance with the maximum electrode voltage occurring during the discharges.

8. Apparatus as defined in claim 7 wherein said monotonically increasing voltage waveform is a ramp function.

9. Apparatus as defined in claim 5 wherein said detecting means includes a reference oscillator for supplying reference pulses at a repetition frequency close to the pulse repetition frequency of the igniting means; a mixer responsive to said reference pulses and to the pulses supplied to said pair of electrodes for producing output pulses at a frequency equal to the difference between said pulse repetition frequencies; and an indicator for indicating changes in said output pulse frequency, which changes correspond to changes in the concentration of such gaseous impurities in the given atmosphere.

10. Apparatus as defined in claim 2 wherein said detecting means includes a capacitor connected to receive a predetermined amount of charge due to each low intensity spark discharge between said electrodes, which amount is proportional to the maximum electrode voltage occurring during such discharge, and a neon lamp connected across said capacitor having an ignition voltage $n$ times as large as said amount of charge divided by the capacitance of the capacitor, whereby the neon lamp flashes at a rate equal to $1/n$ times the repetition rate of said pulses and changes in its flashing rate indicate the presence of such gaseous impurities.

11. Apparatus as defined in claim 1 for detecting gaseous impurities having dielectric breakdown potentials greater than that of said given atmosphere, including:
   a first pair of electrodes disposed in a housing containing said given atmosphere without such impurities, and a second pair of electrodes disposed in a housing exposed to the given atmosphere and any impurities contained therein, said given atmosphere having a higher dielectric breakdown potential with respect to said first pair of electrodes than with respect to said second pair of electrodes;

said detecting means being connected to indicate whether the low intensity spark discharge is occurring across said first or said second pair of electrodes.

12. Apparatus as defined in claim 1 for detecting gaseous impurities having dielectric breakdown potentials lower than that of said given atmosphere, including:

a first pair of electrodes disposed in housing containing said given atmosphere without such impurities and a second pair of electrodes disposed in a housing exposed to the given atmosphere and any impurities contained therein, said given atmosphere having a higher dielectric breakdown potential with respect to said second pair of electrodes than with respect to said first pair of electrodes;

said detecting means being connected to indicate whether the low intensity spark discharge is occurring across said first or said second pair of electrodes.

13. Apparatus as defined in claim 11 wherein the gap formed by the first pair of electrodes is wider than the gap formed by the second pair of electrodes.

14. Apparatus as defined in claim 11 wherein the gap formed by the second pair of electrodes is wider than the gap formed by the first pair of electrodes.

15. A method of detecting the presence in a given atmosphere of gaseous impurities having dielectric breakdown potentials different from that of the given atmosphere, comprising:

periodically igniting and extinguishing a low intensity spark discharge between at least one pair of electrodes disposed in the given atmosphere, such discharge being extinguished and permitting space charges in the vicinity of the discharge to be dissipated, between successive ones of said discharges; and detecting changes in the maxium electrode voltage from its value in the absence of impurities, which changes indicate the presence of such gaseous impurities.

References Cited

UNITED STATES PATENTS

| | | | |
|---|---|---|---|
| 2,640,870 | 6/1953 | Seitz | 324—33 |
| 2,654,051 | 9/1953 | Kenty | 324—24 |
| 3,022,498 | 2/1962 | Alcott | 340—253 |
| 3,046,396 | 7/1962 | Lovelock | 324—33X |
| 3,277,364 | 10/1966 | Abrahamson | 324—54 |
| 3,339,136 | 8/1967 | Rasor et al. | 324—54 |

GERALD R. STRECKER, Primary Examiner

U.S. Cl. X.R.

340—242

UNITED STATES PATENT OFFICE
CERTIFICATE OF CORRECTION

Patent No. 3,559,049     Dated January 26, 1971

Inventor(s) Leonard N. Liebermann and Stanley H. Lai

It is certified that error appears in the above-identified patent and that said Letters Patent are hereby corrected as shown below:

In the Masthead of the patent, after "Stanley H. Lai, 4164 Hill St., San Diego, Calif. 92107" the following should appear:

--assignors to Thermal Industries of Florida, Inc., corporation of the State of Delaware--.

Signed and sealed this 14th day of December 1971.

(SEAL)
Attest:

EDWARD M. FLETCHER, JR.
Attesting Officer

ROBERT GOTTSCHALK
Acting Commissioner of Patent